(12) United States Patent
Shepley et al.

(10) Patent No.: US 7,934,644 B2
(45) Date of Patent: May 3, 2011

(54) CARD ACTIVATED CASH DISPENSING AUTOMATED TRANSACTION MACHINE SYSTEM AND METHOD

(75) Inventors: Steven Shepley, Uniontown, OH (US); Joseph Cwikla, Tallmadge, OH (US); Bryan Reed, Canal Fulton, OH (US); James Block, North Lawrence, OH (US); Robert Usner, Morrisville, NC (US); Jay Paul Drummond, Massillon, OH (US); Mark D. Smith, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 12/378,491

(22) Filed: Feb. 14, 2009

(65) Prior Publication Data
US 2009/0261159 A1 Oct. 22, 2009

Related U.S. Application Data

(63) Continuation of application No. 12/075,236, filed on Mar. 10, 2008, now Pat. No. 7,490,762, which is a continuation of application No. 09/863,911, filed on May 23, 2001, now Pat. No. 7,341,177, which is a continuation-in-part of application No. 09/193,637, filed on Nov. 17, 1998, now Pat. No. 6,289,320, which is a continuation-in-part of application No. PCT/US97/21422, filed on Nov. 25, 1997.

(60) Provisional application No. 60/207,043, filed on May 25, 2000, provisional application No. 60/098,907, filed on Sep. 2, 1998, provisional application No. 60/095,626, filed on Aug. 7, 1998, provisional application No. 60/091,887, filed on Jul. 7, 1998, provisional application No. 60/031,956, filed on Nov. 27, 1996.

(51) Int. Cl.
*G07F 19/00* (2006.01)
(52) U.S. Cl. .................................................. 235/379
(58) Field of Classification Search .................. 235/379, 235/380; 705/35
See application file for complete search history.

(56) References Cited

U.S. PATENT DOCUMENTS
5,265,033 A 11/1993 Vajk et al.
(Continued)

FOREIGN PATENT DOCUMENTS
JP 2002032571 A 1/2002
(Continued)

OTHER PUBLICATIONS

"Internet Technology Pushes New Services to ATMs", Bank Network News, v. 15, n 22, p. 7, Dialog File 9, Access No. 01808807. Apr. 1997.

(Continued)

*Primary Examiner* — Daniel A Hess
(74) *Attorney, Agent, or Firm* — Ralph E. Jocke; Daniel D. Wasil; Walker & Jocke

(57) ABSTRACT

An automated banking machine operates responsive to data read from data bearing records. The machine includes a card reader that is operative to read data from user cards corresponding to financial accounts. The machine includes at least one computer and a plurality of transaction function devices. The machine further includes a plurality of device driver components that generally correspond to each of the transaction function devices. The device drivers are operative responsive to communication from an XFS layer to control the operation of the transaction function devices. The machine operates responsive to markup language documents to accomplish financial transfers.

23 Claims, 4 Drawing Sheets

U.S. PATENT DOCUMENTS

| | | | |
|---|---|---|---|
| 5,473,143 | A | 12/1995 | Vak et al. |
| 5,706,442 | A | 1/1998 | Anderson et al. |
| 5,729,594 | A | 3/1998 | Klingman |
| 5,742,845 | A * | 4/1998 | Wagner .......................... 710/11 |
| 5,933,816 | A * | 8/1999 | Zeanah et al. .................. 705/35 |
| 6,012,050 | A | 1/2000 | Eaton et al. |
| 6,047,051 | A | 4/2000 | Ginzboorg et al. |
| 6,138,162 | A | 10/2000 | Pistriotto et al. |
| 6,173,311 | B1 | 1/2001 | Hassett et al. |
| 6,598,023 | B1 | 7/2003 | Drummond et al. |

FOREIGN PATENT DOCUMENTS

| | | | |
|---|---|---|---|
| JP | | 2004038771 A | 2/2004 |

OTHER PUBLICATIONS

Block, V. "Home Banking Displaced Teller Machines at Retail Delivery Conference", American Banker, v. 161, p. 16(1), Dialog file 148, Access No. 09157331. Dec. 1996.

"1997 to Emerge as the Golden Year of ATMs", EFT Report v20, n1, Dialog File 16, Access No. 04760158. Jan. 1997.

"IBM Launches Internet ATM", HK Econimic Times, Dialog File 583, Access No. 06547476. Nov. 1997.

Caldwell, B., "ATMs Mission: Generate Profits", InformationWeek, n653, p104(3), Dialog file 148, Access No. 09805369. Oct. 1997.

"Diebold and Wells Fargo Bank Demonstrate Web-Enabled ATM Architecture", PR Newswire. Dialog file 16, Access No. 05363743. Dec. 1997.

"Net-Enabled Automated Teller Machines Win Microsoft Support", Computergram International, n3304. Dialog 16, Access No. 05365588. Dec. 1997.

"Diebold Introduces Microsoft-Support ATM Internet Software with Keybank", PN Newswire, p1203CLW008. Dialog file 16, Access No. 0565011. Dec. 1997.

" Turning Automated Banking Machines into Automated Browsing Machines", Report on Home Banking and Financial Services, v2, n11, p6+. Dialog file 9, Access No. 01785926. Mar. 1997.

John R. Levine, et al., "The Internet for Dummies", Glossary, 4th ed., (1997).

IBM Technical Discussion Bulletin: Title: Security for Routing Based on Link State Algorithms; vol. 39; Mar. 1, 1996.

* cited by examiner

CARD ACTIVATED CASH DISPENSING AUTOMATED TRANSACTION MACHINE SYSTEM AND METHOD

CROSS REFERENCE TO RELATED APPLICATIONS

This application is a continuation of co-pending U.S. application Ser. No. 12/075,236 filed Mar. 10, 2008, which is a continuation of U.S. application Ser. No. 09/863,911 filed May 23, 2001, which is a continuation-in-part of U.S. application Ser. No. 09/193,637 filed on Nov. 17, 1998 (now U.S. Pat. No. 6,289,320), which is a continuation-in-part of International Application PCT/US97/21422 filed on Nov. 25, 1997 and which designated the U.S. (now U.S. application Ser. No. 09/077,337). The nonprovisional applications designated above, namely application Ser. Nos. 09/863,911, 09/193,637 and PCT/US97/21422 claim the benefit of U.S. Provisional Applications Nos. 60/031,956 filed on Nov. 27, 1996; 60/091,887 filed on Jul. 7, 1998; 60/095,626 filed Aug. 7, 1998; 60/098,907 filed Sep. 2, 1998, and 60/207,043 filed on May 25, 2000. The disclosures of all of these applications are incorporated herein by reference in their entirety.

TECHNICAL FIELD

The technical field appears to substantially correspond to USPTO class 235 under one or more of subclasses 375, 379, 380, and 382. An embodiment relates to card activated cash dispensing automated transaction machines associated with a banking system. Specifically embodiments relate to a new cross-vendor software and hardware platform architecture for card activated cash dispensing automated transaction machines.

BACKGROUND ART

Automated transaction machines are known in the prior art. Automated transaction machines are used to electronically carry out transfers representative of value. Automated transaction machines include for example, cash dispensers, ticket dispensers, scrip dispensers, gaming machines, Automated Teller Machines (ATMs) and other self service terminals. For purposes of convenience all such automated transaction machines will be referred to herein as ATMs unless otherwise specifically indicated.

ATMs may include various types of transaction function devices. These devices are operated to carry out transactions. Different types of ATMs include different types of devices. The different types of devices enable the ATM to carry out different types of transactions. For example, some types of ATMs include a depository for accepting deposits while other ATMs do not. Some ATMs have a "touch screen" while others have separate displays and input buttons. ATMs can also be fitted with devices such as cash and coin acceptors, statement printers, check validators, bill acceptors, thumb print readers and other types of devices, while other ATMs do not include such devices.

Many financial institutions wish to add new functionality to their existing ATMs. For example, a bank with ATMs for dispensing cash may wish to add a statement printer to each of the ATMs for printing a customer's banking statement. Such new functionality usually requires additional software modifications to the ATM in addition to the new hardware. Unfortunately the process of updating ATM software is typically complicated by the fact that many financial institutions purchase ATM hardware from more than one manufacturer. Thus to add new software for performing a new function such as printing banking statements, separate applications must be written or modified for each vendor specific ATM platform. Porting applications to multiple ATM platforms significantly reduces the productivity of the ATM software developers. Consequently, there exists a need for an architecture that enables developers to write ATM applications that work without modification on a plurality of proprietary ATM platforms.

To achieve this goal industry standards are being developed which are designed to enable ATM hardware and software to be cross-vender compatible. One example of such a standard is WOSA/XFS (Windows Open Services Architecture/eXtensions for Financial Services) which is defined by the CEN/ISSS XFS standard committee. FIG. 1 shows a schematic view of the standard WOSA/XFS architecture. An exemplary WOSA/XFS enabled ATM 110 may include a WOSA/XFS Manager 112. The WOSA/XFS Manager 112 includes a standardized interface to enable an ATM terminal application 114 to communicate with ATM transaction function devices 116. Each transaction function device 116 includes a corresponding service provider interface (SP) 118. The SPs 118 are supplied by the vendors of the ATM devices 116 and are specially designed to accept requests from the WOSA/XFS Manager 112 and pass those requests on to the corresponding device 116. Theoretically the ATM terminal application 114 will be able to run on any vendor's ATM hardware 120 as long as both the ATM terminal application 114 and the vendor's implementation of the SPs 118 adhere to the WOSA/XFS specifications.

Another example of an emerging industrial standard for an ATM hardware/software architecture is J/XFS (Java/eXtensions for Financial Services). Unlike WOSA-XFS which is designed for Microsoft Windows® platforms only, J/XFS is a Java® based architecture that may be implemented on any hardware/software platform that supports a Java® Virtual Machine (JVM). As shown in FIG. 2, a J/XFS enabled ATM 210 may include a J/XFS Kernel. The J/XFS Kernel is similar in functionality to the previously described WOSA/XFS Manager 112, however the J/XFS Kernel runs in a JVM 224. The J/XFS Kernel is operative responsive to commands from an ATM terminal application 214 to have a device service layer 220 control the operation of ATM devices 216. Like the previously described SPs 18, the device service layer 220 includes vendor provided device services 218 that correspond to the vendor's hardware devices 216.

As with the WOSA/XFS architecture, the ATM terminal application 214 will theoretically be able to run on any vendor's ATM hardware as long as both the ATM terminal application 214 and the vendor's implementation of the device services 218 adhere to the J/XFS specifications. Unfortunately with each of these described architectures there are "grey" areas within the standards that are subject to vendor interpretation. Because of these "grey" areas some vendors have created WOSA/XFS SPs that work differently for the same type of device as another vendor's SPs. Also, some vendors have deliberately made modifications to portions of an SP interface or to its operation for reasons that are uniquely theirs. The consequence of this is that what is intended to be a cross-vendor ATM application will most likely have to be modified or "tweaked" before it will truly operate with another vendor's SPs.

For example the WOSA/XFS standard provides a number of different methods for having a card reader SP interface with a card reader for returning information read from a card. These methods include a first method of passing individually selected information and a second method of passing all the card information in a single form. Although it would seem that an application could use either method to retrieve card information from any vendor's card reader, in reality one vendor's card reader SP may only support the first method, whereas a second vendor's card reader SP may only support the second method. These types of incompatibilities or differences in interpretation of the WOSA/XFS standard undermine the intended goal of cross-vendor compatibility between ATM applications and ATM hardware.

Although the J/XFS architecture is just being developed it shares the similar WOSA/XFS architecture limitation of using device services that are vendor provided. As a result different vendor interpretations of the J/XFS specification have the potential of forcing developers to write modified versions of their ATM terminal applications for each vendor's ATM platform. Consequently there exists a need for an ATM architecture that addresses these deficiencies in the WOSA/XFS or J/XFS architectures, or any other ATM architecture that is subject to vendor interpretation for developing device drivers.

In general each of the previously described XFS architectures defines a standard for the lowest common denominator of ATM hardware features. Unfortunately by including only those features that are common to all ATM hardware devices, the XFS standards cannot include interfaces to unique features associated with a vendor's particular implementation of a transaction function device. One example of unique features that are not implemented in the XFS interfaces includes access to low level diagnostic testing of individual hardware components of a device. Such control over low level hardware functionality can be very useful when troubleshooting problems with a specific component such as a motor or sensor. Unfortunately as each vendor may mechanically and/or electronically construct a particular type of device completely differently than another vendor, the XFS standards have not attempted to implement methods for testing low level vendor specific hardware. Consequently there further exists a need for an XFS enabled ATM that offers low level diagnostic testing of ATM hardware.

DISCLOSURE OF INVENTION

It is an object of the exemplary form of at least one embodiment to provide a cross-vender compatible automated transaction machine architecture.

It is a further object of the exemplary form of at least one embodiment to provide a cross-vender compatible automated transaction machine architecture that improves the ability of a single application to function properly on different ATM platforms.

It is a further object of the exemplary form of at least one embodiment to provide a cross-vender compatible automated transaction machine architecture with features for troubleshooting ATM hardware.

It is a further object of the exemplary form of at least one embodiment to provide a cross-vender compatible automated transaction machine architecture with features that simplify programming of ATM applications.

Further objects of at least one embodiment will be made apparent in the following Best Modes for Carrying Out Invention and the appended claims.

The foregoing objects are accomplished in one exemplary embodiment by an ATM that comprises a computer and a plurality of transaction function devices in operative connection with the computer. The ATM further includes at least one XFS layer such as the WOSA/XFS Manager or the J/XFS kernel. In addition, the ATM includes a device driver layer that includes vendor provided device drivers such as the WOSA/XFS service providers or the J/XFS device services. The device drivers generally correspond to each of the transaction function devices and are responsive to commands from the XFS layer to control the operation of the transaction function devices.

The ATM further includes at least one terminal application and an Open Device Services (ODS) layer. The ODS layer includes a plurality of ODS components that generally correspond to the device drivers and/or transaction function devices. An ODS component is operative responsive to the terminal application to control at least one transaction function device through communication with the XFS and device driver layers. The ODS component layer is adapted to provide the terminal application with a consistent interface for communicating with vendor provided device drivers which may have inconsistent implementations for interfacing with the particular XFS layer.

In one exemplary embodiment the ODS layer is operatively programmed to communicate with device drivers from different vendors such that each of the corresponding transaction function devices operate the same. In another exemplary embodiment the ODS layer is operative to include ODS components that are exchangeable to correspond to different vendor implementations of a device driver for a particular type of transaction function device. For example if the ATM includes a card reader and a corresponding device driver from vendor A, the ODS layer is operative to include a first ODS component that is compatible with vendor A's device driver and card reader. If the card reader from vendor A is exchanged with a new card reader and corresponding device driver from vendor B, the ODS layer is operative to enable the first ODS component to be exchanged with a second ODS component that is compatible with Vendor B's device driver and card reader. Both the first and second ODS components include identical interfaces which are accessed by the terminal application in the same manner to have either vendor's A or Vendor B's card reader perform the same card reader functions. Regardless of whether the ODS layer includes an ODS component that corresponds to a first vendor's, a second vendor's or any other vendor's transaction function device, the terminal application is operative to communicate with the ODS layer to have any vendor's hardware perform the same functions.

In an alternative embodiment, the ODS layer is further operative to communicate with more than one XFS layer. For example an ATM may include both a WOSA/XFS Manager and a J/XFS Kernel with different sets of devices for each XFS layer. As discussed previously J/XFS is a Java® based architecture that may be implemented on any hardware/software platform that supports a Java® Virtual Machine (JVM). Examples of automated transaction machines that include a Java based architecture are found in U.S. application Ser. No. 09/193,637 which is incorporated herein by reference in its entirety. Rather than developing a complex terminal application that must be specifically programmed to access different XFS layers, in the exemplary embodiment, the terminal application only needs to be programmed to communicate with the ODS layer as previously described. The ODS layer is operative to route the terminal application commands through the correct XFS layer. Those devices that include WOSA/XFS service provider interfaces will have corresponding ODS components that are operative to communicate with the WOSA/XFS Manager. Those devices that include J/XFS device services will have corresponding ODS components that are operative to communicate with the J/XFS Kernel. In a further alternative embodiment, each ODS component is operative to communicate with either XFS layer depending on ODS configuration parameters which specify which XFS layer each ODS component should use to communicate with devices.

To further simply the task of developing terminal application software, the exemplary embodiment further comprises terminal element controls (TECs). TECs are high level programming objects that encapsulate much of the low level functions and structures needed to interact with one or more transaction function devices. TEC objects may be operatively configured in any object package that the terminal application designer prefers. Examples of operative object configurations for TECs include OCXs, Active X objects, COM object, JavaBeans, EJBs or any other object that can be integrated into a terminal application.

For example an interface to a card reader in the previously described XFS architecture includes a complex assortment of methods and structures that must be dealt with just to operate a card reader and to read a card. Integrating this interface into a terminal application can require significant effort. An exemplary card reader TEC object of an embodiment provides a simplified interface that includes five methods: 1) enable the card reader; 2) read a card; 3) write a card; 4) return a card; and 5) retain a card. Exemplary TEC objects also include configurable parameters or properties such as the amount of time that a card should be presented to a customer before it is retained.

With the described exemplary architecture, the terminal application can be programmed in any language or on any platform that can either directly access the ODS layer or that can incorporate TEC objects. In this manner a terminal application can be developed as a stand alone Windows® application, a browser based application, Java® application, or any other type of application that is operative to incorporate TEC Objects.

TEC objects of the exemplary embodiment are also operative to combine functions that span multiple devices. For example a card reader TEC may also interact with related hardware such as a light indicator to draw a customer's attention to the card reader. In addition the exemplary card reader TEC may also interact with a beeping device for signaling the customer to remove their card from the card reader. In a pure XFS application these simple actions would require low level coding to all three XFS interfaces that correspond to the card reader, sensors/indicators and sound device. In the exemplary embodiment the TEC objects are operative to interface with the previously described ODS layer. However, in alternative embodiments the TEC objects may be operatively programmed to access the XFS layer directly.

In addition to enabling new terminal applications to be written for cross-vendor hardware compatibility, exemplary embodiments are operative to enable pre-existing proprietary terminal applications to run on another vendor's hardware. For example proprietary terminal control software typically includes a plurality of proprietary drivers for controlling a plurality of different transaction function devices. When new devices are developed or improved the proprietary terminal applications are typically updated to include new proprietary drivers for controlling the new or updated hardware. In one exemplary embodiment the proprietary terminal application software may be updated to indirectly access ATM hardware through the ODS layer rather than through the proprietary drivers. By accessing the ODS layer, proprietary terminal control software is operative to function on any vendor's hardware that is XFS enabled.

In another alternative embodiment the device drivers such as the WOSA/XFS service providers or the J/XFS device services are adapted to include a diagnostic interface. The diagnostic interface provides external applications with access to specific low level features of the hardware that corresponds to the device drivers. For example a cash dispenser device driver may be adapted to include an interface for manipulating individual motors or sensors in the corresponding cash dispenser transaction function device. Such access is provided to applications independently of the XFS layer. In an exemplary embodiment, a diagnostic application may be operatively programmed to access the diagnostic interfaces of a plurality of different device drivers. Such an exemplary diagnostic application may use the XFS layer to deactivate one or more devices from XFS communication. Once the devices have been taken off-line with respect to the XFS components, the diagnostic application may enable a programmer or service technician to directly access ATM hardware through the corresponding diagnostic interface for trouble shooting, repair and other maintenance purposes.

BEST MODES FOR CARRYING OUT INVENTION

Figure 1:
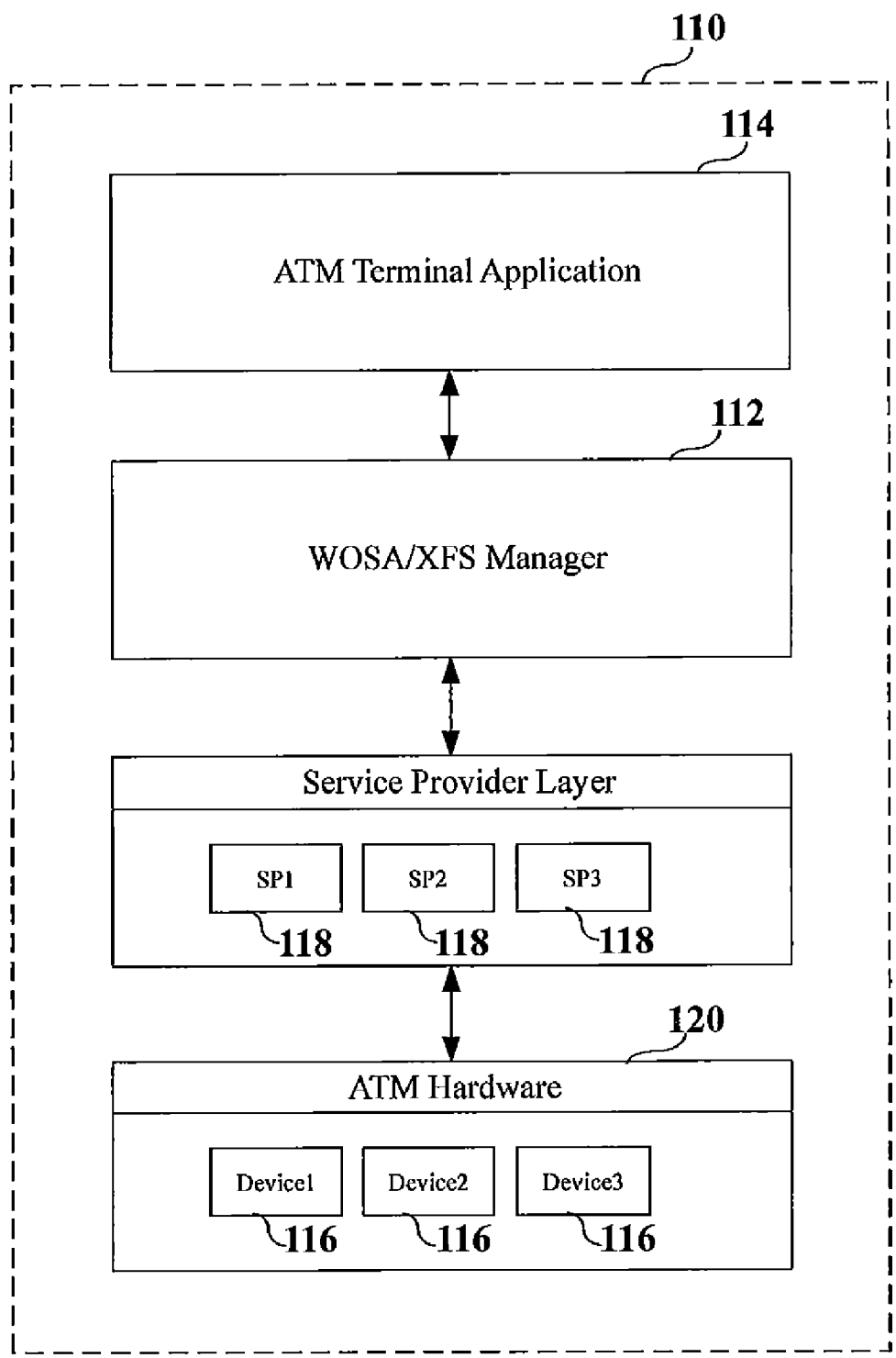
FIG. 1 is a schematic view representative of a WOSA/XFS enabled ATM.
Figure 2:
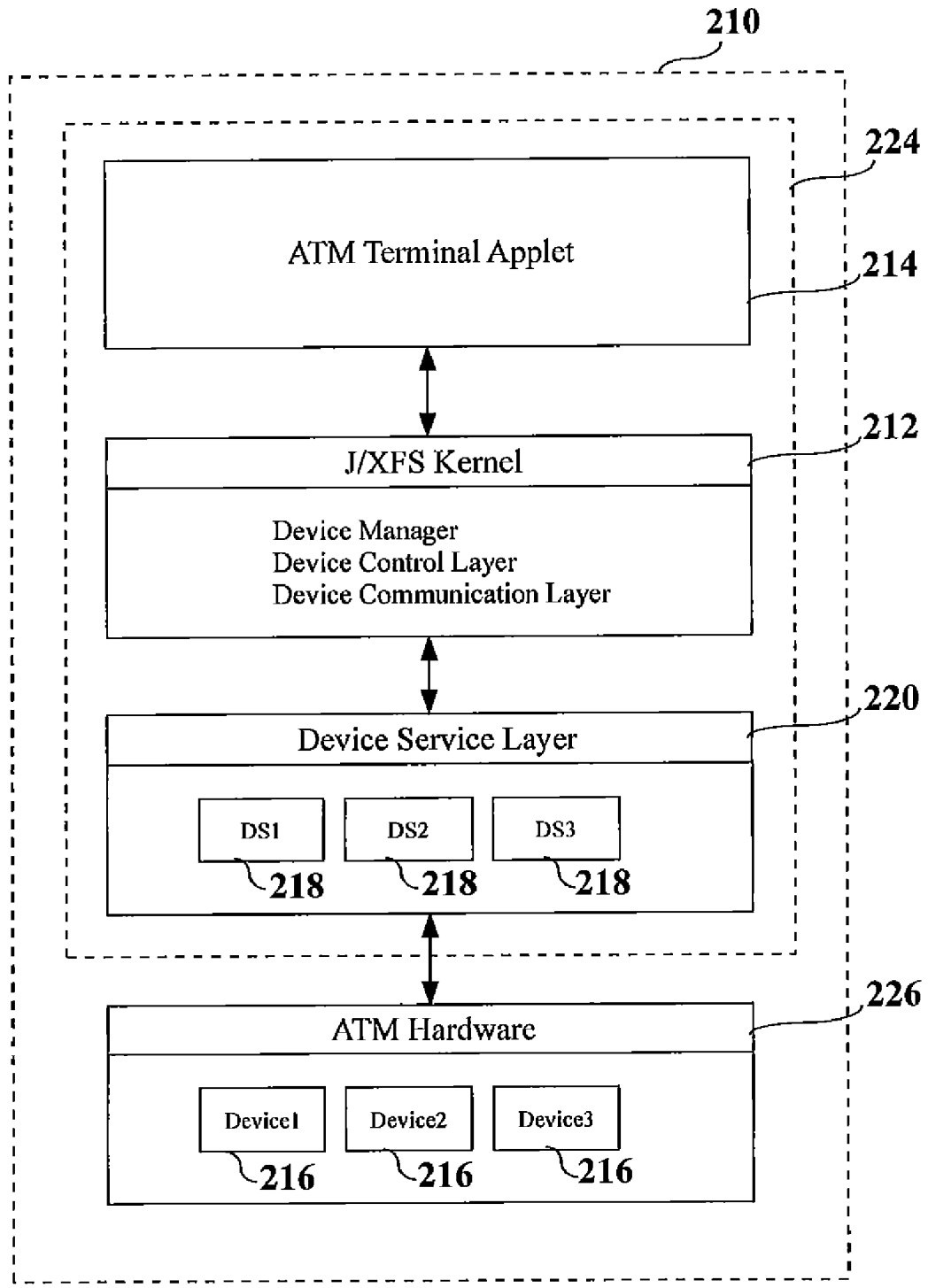
FIG. 2 is a schematic view representative of a J/XFS enabled ATM.
Figure 3:
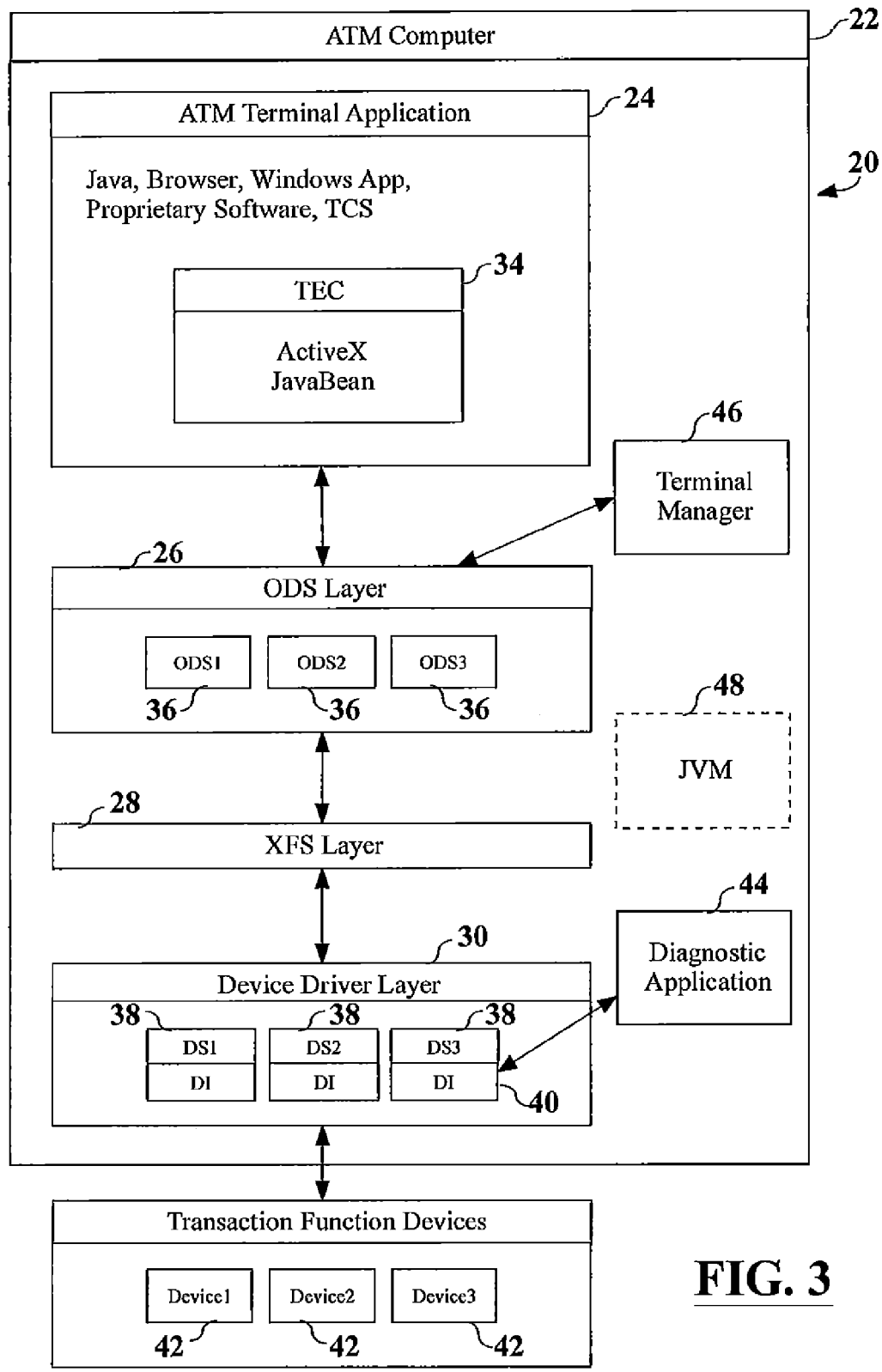
FIG. 3 is a schematic view representative of an exemplary XFS enabled ATM.

Referring now to the drawings and particularly to FIG. 3, there is shown therein a schematic view representative of an exemplary embodiment of a cross-vendor ATM architecture 20. Here the ATM architecture 20 includes an computer 22 that is in operative connection with a plurality of transaction function devices 42. Such transaction function devices may include for example such devices as a note dispenser, coin dispenser, card reader, printer, key pad, display device, function keys, depositor, cash acceptor or any other hardware device that may be operatively connected to an ATM.

The computer 22 includes a software component including terminal application 24 that is operative to control the operation of the transaction function devices 42. The computer 22 further includes an XFS layer 28 that corresponds to a multi-vendor supported interface for ATM devices such as the WOSA/XFS Manager or the J/XFS Kernel. In addition, the computer 22 further includes a device driver layer 30 that includes a plurality of device driver components 38 that correspond to the XFS layer. For example if the XFS layer corresponds to the WOSA/XFS Manager, the device driver components 38 correspond to the WOSA/XFS service provider interfaces. If the XFS layer corresponds to the J/XFS Kernel, the device driver components 38 correspond to the J/XFS device services.

For each transaction function device 42, a device driver 38 must be installed in the computer that is operative to enable commands passed through the XFS layer 28 to control the operation of the transaction function devices 42. In one exemplary embodiment the device drivers 38 are manually installed from a portable physical media such as a disk or CD supplied by the manufacture of the device. In another exemplary embodiment the device drivers are operatively downloaded from a data store of device drivers that is in operative connection with the computer. In a further exemplary embodiment the device drivers are retrieved by the computer 22 from the transaction function devices 42 themselves using a service configuration protocol such as Sun Microsystems JINI™ or Microsoft Universal Plug and Play™.

Each of the device drivers 38 are operative responsive to the XFS layer 28 to have at least one transaction function device 42 perform a function. For example a card reader device driver is operative responsive to a read card request from the XFS layer 28 to have its corresponding card reader device physically read information from a card and return the information through the XFS layer. Another device driver such as a note dispenser device driver is operative responsive to a dispense request from the XFS layer 28 to have its corresponding cash dispenser dispense an amount of notes.

In the exemplary embodiment, the terminal application 24 is operative to control transaction function devices 42 through communication with the XFS layer 28. However, rather than having the terminal application 24 communicate with the XFS layer directly, the exemplary embodiment includes an ODS layer 26 operative in the computer 22 between the terminal application 24 and the XFS layer 28. The ODS layer 26 is operative responsive to the terminal application 24 to control the functionality of transaction function devices 42 through communication with the XFS and device driver layers 28 and 30. The ODS layer 26 includes a plurality of ODS components 36 that generally correspond to the device drivers 38 and/or the transaction function devices 42. For example the exemplary may include a card reader ODS component that corresponds to a card reader device driver for a card reader. An exemplary embodiment may also include a note dispenser ODS component that corresponds to a note dispenser device driver for a note dispenser.

When device drivers from two or more vendors generally communicate with the XFS layer in a consistent manner, a single ODS component may be used when either of the drivers are installed in the ATM. However, if the vendor specific device drivers implement communication with the XFS layer in a different manner, vendor specific ODS components may be operatively programmed for each of the vendor specific device drivers. A vendor specific ODS component may then be installed in the ODS layer responsive to whichever vendor specific device driver is installed in the ATM. The vendor specific ODS component is operative to communicate through the XFS layer in a manner that is appropriate for the particular implementation of the vendor specific driver.

Although each vender specific ODS component may communicate with the XFS layer in a different manner, all of the vendor specific ODS components for a particular type of device share a common interface for access by external applications such as the terminal application 24. The ODS layer 26 is thus operative to isolate the inconsistencies in communication between different device drivers, and to present the terminal application 24, or any other application, with a common set of methods, properties and events for communicating with transaction function devices from different vendors.

The exemplary form of an embodiment encompasses a testing process that is operative to identify unique characteristics and/or inconsistencies in a vendor's implementation of a device driver and to operatively adapt ODS components to include those features that are necessary to properly and consistently communicate with the device driver through the XFS layer.

In general the testing process includes the configuration of the particular vendor's hardware device and corresponding device driver on an XFS enabled test platform. The test platform typically includes a computer system with an XFS layer and an ODS component that corresponds to the particular type of the vendor's device. For example if the particular device being tested is a note dispenser, an ODS component that corresponds to an XFS device driver for a note dispenser is installed in the test platform.

The test platform further includes a testing application. The testing application is operative to interface with the ODS component and issue a plurality of commands through the ODS component to control the operation of the vendor's device. A user may monitor and/or interact with the device and the test application to determine which functions of the device may or may not work properly with the ODS component.

For example when testing a card reader the testing application enables a user to issue a command to the ODS component to have the device read a card. The testing application is further operative to output to the user the results of the operation. If the operation appears to work correctly, the testing application may display the contents of the information read from the card. A user may then verify that the contents are correct. If the operation failed, the user may evaluate the error messages that are generated. In addition if the operation triggers an unexpected event through the XFS layer, the testing application is further operative to report what events have been triggered as a result of the operation.

In addition to monitoring the testing application, the user may also monitor the actual device to determine if the operation produces the correct function. For example if the device corresponds to a note dispenser, the testing application may include an operation to dispense a certain amount of cash or number of notes through communication with a cash dispenser ODS. By monitoring the cash dispenser the user can determine if the correct amount of cash was dispensed, for example. After functional problems between the current ODS component and the device have been identified, the ODS component may be operatively modified to compensate for the idiosyncrasies associated with the vendor's implementation of the device driver. The modified ODS component may then be further tested on the testing platform to either uncover further inconsistencies or to certify that the ODS component works properly. Once an ODS component has been certified, it may be installed in any ATM that includes the tested vendor's device, device driver and corresponding XFS layer to enable a terminal application to properly control the device's functionality.

In the exemplary embodiment the terminal application 24 may be based on any programming architecture that is operative to communicate with the ODS layer 26. In one exemplary embodiment the terminal application may be a stand-alone, Windows®-based application. In an alternative exemplary embodiment the terminal application may include a browser and a plurality of web page documents. In another exemplary embodiment the terminal application may be a Java® application that is operative in a Java Virtual Machine (JVM).

In addition the ODS layer may be based on any programming architecture that is operative to communicate with the XFS layer 28. For example if the XFS layer corresponds to a J/XFS Kernel running in a JVM 48 of the computer 22, the ODS components may be constructed as Java Beans that are operative in the JVM. If the XFS layer corresponds to the WOSA/XFS Manager, the ODS components may be constructed as a plurality of Windows® based DLLs. If portions of the XFS layer and/or terminal application are both Windows® based and Java® based, the ODS layer may include components operative in the JVM and components operative as DLLs. In other embodiments, the ODS layer and terminal application may be configured as other types of applets, modules or libraries which are appropriate for the operating system architecture and the XFS layer.

To enhance the productivity of programmers who develop a terminal application, the exemplary embodiment comprises the integration of transaction element components (TECs) 34 with the terminal application 24. TECs are objects or classes such as ActiveXs or Java Beans that encapsulate the complex operation of one or more transaction function devices 42 into a package of streamlined methods, properties and events. The TEC objects include the necessary functionality to communicate with the ODS layer. In the exemplary embodiment an entire terminal application can be constructed from TEC objects.

Although the ODS components 36 may generally have a one to one relationship with corresponding device drivers 38 and/or transaction function devices 42, the TEC objects combine logical groupings of functions for different devices resulting in the TEC objects having generally one to many relationships with ODS components.

Figure 4:
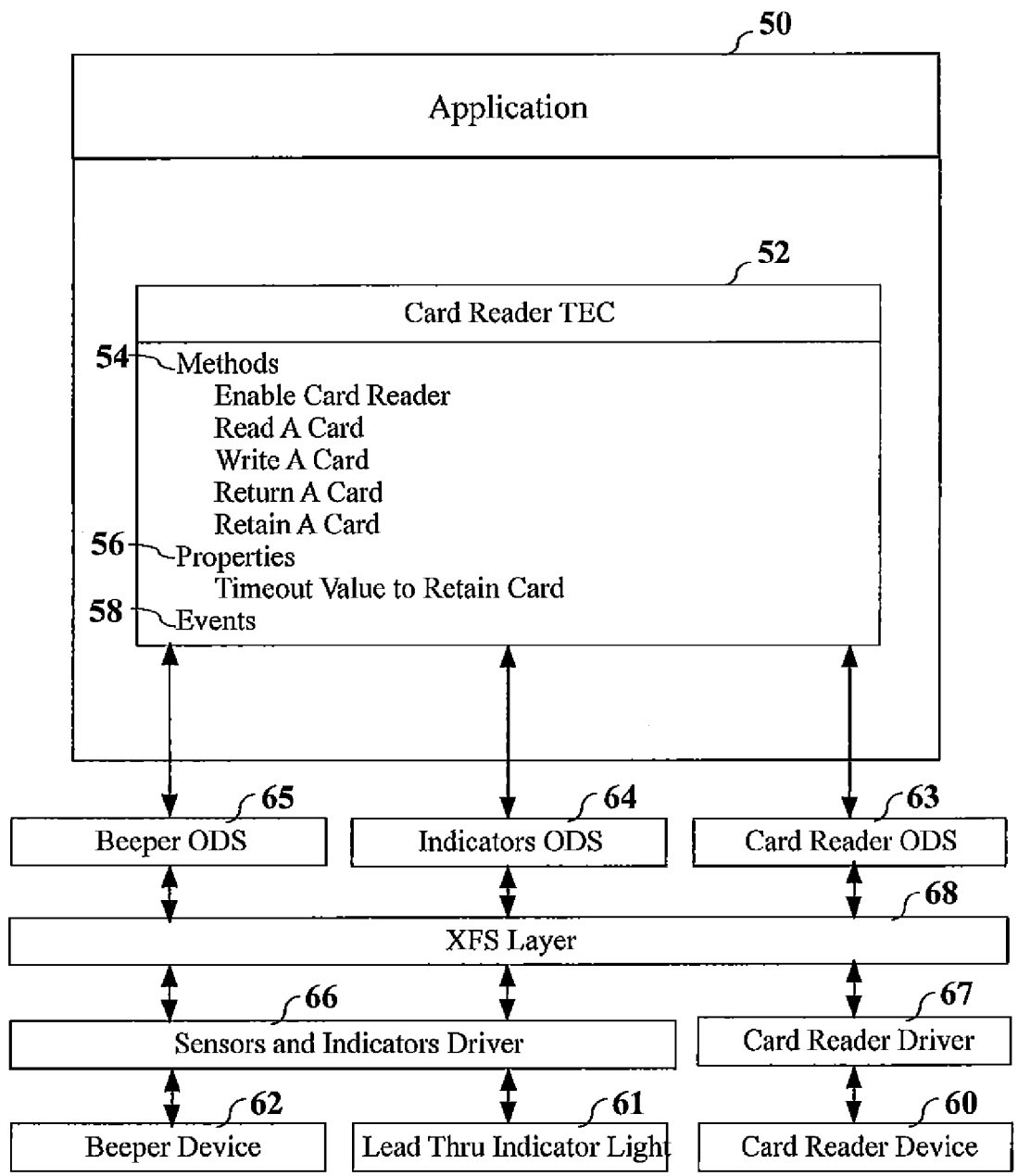
FIG. 4 is a schematic view representative of an exemplary terminal application that includes an exemplary card reader TEC to interact with exemplary ODS components.

FIG. 4 shows an exemplary terminal application 50. The terminal application includes a card reader TEC 52. The application 50 is operative to invoke methods 54 of the card reader TEC 52 such as enabling a card reader, read a card, write a card, return a card and retain a card. The application 50 is further operative to set properties 56 of the card reader TEC 52 such as the time out value before a card is returned by the card reader. In addition, the application is further operative to monitor one or more events 58 that are triggered through the card reader TEC.

The exemplary card reader TEC 52 is operative to communicate with three different hardware devices including a card reader device 60, a lead through indicator device 61 and a beeper device 62. The exemplary card reader TEC 52 interfaces with these devices through communication with three corresponding ODS components including a card reader ODS 63, an indicator ODS 64 and a beeper ODS 65.

Through communication with the card reader ODS 63, the card reader TEC 52 is operative to have the card reader device 60 perform a plurality of functions such as enabling the card reader, reading a card and returning the card to a customer. The card reader ODS communicates with the card reader device through the XFS layer 68 and the card reader driver 67. When enabling the card reader, the exemplary card reader TEC 52 is further operative to automatically activate a lead thru indicator light 61 to draw a customer's attention to the card reader 60. This is performed by communicating with a sensors and indicators. Device driver 66 through interaction with the indicators ODS 64. In addition, when a beeping sound is desired to signal the customer to remove their card, the exemplary card reader TEC 52 interacts with the beeper ODS 65 to have the sensors and indicators driver 66 activate the beeper device 62. The exemplary TECs are operative to combine device interaction in a logical manner by communicating with more than one ODS component and corresponding devices in response to various methods of the TEC being invoked.

In addition to enabling the generation of cross-vender compatible terminal applications that either includes TEC objects, or is operative to interface with the ODS layer directly, the exemplary embodiment encompasses adapting pre-existing and proprietary terminal control software of one vendor to run on another vendor's ATM hardware. Such proprietary terminal control software typically communicates with a plurality of proprietary device drivers directly without accessing a middle layer interface such as the previously described XFS layers. Consequently proprietary terminal control software has previously been limited to running only on a specific vendor's hardware platform. However, the exemplary embodiment is further operative to enable such proprietary software to properly control another vendor's transaction function devices when installed on another vendor's ATM platform. This is achieved by adapting the proprietary software to communicate with ODS components rather than proprietary device drivers. Once the proprietary terminal control software has been so adapted, the software is operative to run on another vendor's ATM platform that includes an XFS layer and corresponding XFS compatible device drivers.

As shown in FIG. 3, the exemplary XFS compatible device drivers 38 of an exemplary form of an embodiment may further include diagnostic interfaces 40 in addition to their interfaces with the XFS layer 28. The diagnostic interfaces 40 include additional low level hardware control functions that may be accessed by external applications. The low level functions for example may access specific motors, sensors and other components in the corresponding transaction function devices 42. By employing a diagnostic application 44 to access these low level functions of the device drivers 38 directly, individual mechanical and electronic functions specific to the device can be tested, analyzed and possibly corrected.

In a further exemplary form of an embodiment, the diagnostic interfaces 40 of the device drivers 38 may include an authentication system which is operative to validate that the application attempting to access the low level functions of the device is authorized to do so. In one exemplary embodiment of the authentication system, the diagnostic interface 40 is operative to detect that a valid hardware device such as a dongle is in operative connection with the ATM before an external application is granted access to the transaction function device 42 through the diagnostic interface 40.

In an alternative exemplary embodiment of the authentication system, the diagnostic interface 40 is operative to detect whether a valid license key is present. Such a license key for example may be located on a removable media in operative connection with the ATM such as a floppy disk, CD, magnetic stripe card, smart card, or any other portable medium that the diagnostic interface is operative to access through the machine. The license key may also be associated with the specific application such as the diagnostic application 44 that is operatively programmed to access the diagnostic interfaces of device drivers 38. Communications from the diagnostic application may be required to include a valid license key before the diagnostic interface enables the diagnostic application to access the transaction function device.

In a further exemplary embodiment of the authentication system, the diagnostic interfaces 40 may include a secret password or digital certificate which may be used by the diagnostic interface to determine if an application is allowed access to functions of a corresponding transaction function device. For example, a diagnostic interface of a device driver may require communications from a diagnostic application to be digitally signed. The diagnostic interface may then authenticate the digital signature associated with the communication using one or more digital certificates and/or public keys stored in operative connection with the diagnostic interface. When the digital signature is valid, the diagnostic interface is operative to enable the diagnostic application to access the transaction function device through the diagnostic interface. When the digital signature is determined to be invalid, the diagnostic application is denied access to the transaction function device by the diagnostic interface.

In a further exemplary embodiment, the diagnostic application may be required to send a valid digital certificate to the diagnostic interface prior to being granted access to the transaction function device. The digital certificate may be validated by the diagnostic interface using a trusted public key of a certificate authority that issued the digital certificate. The digital certificate may also be evaluated by the diagnostic interface to determine if it has expired. When the digital certificate has expired or is otherwise invalid, the exemplary embodiment of the diagnostic interface may be operatively programmed to return a message to the calling application which indicates that the digital certificate is not valid and access to the transaction function device is denied. In further exemplary embodiments other software and/or hardware encryption and/or authentication systems may be combined with the diagnostic interfaces of the device drivers to enable the selective validation of users and/or applications attempting to access transaction function devices through communication with the diagnostic interfaces of device drivers The exemplary embodiment further comprises a terminal Manager 46. The terminal Manager 46 is a software application that is operative to configure and manage the ATM through interaction with the ODS layer. In addition to the terminal Manager 46 and the terminal application 24, the ODS layer 26 is operative to enable any application that can access ODS components to be operative on a plurality of different XFS enabled ATM hardware platforms.

Thus the exemplary form of the cross-vendor automated transaction machine architecture achieves at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover the descriptions and illustrations herein are merely examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained, the new and useful structures, devices, elements, arrangements, parts, combinations, systems, equipment, operations, methods and relationships are set forth in the appended claims.

We claim:

1. Apparatus comprising:
an automated banking machine that operates responsive to data read from data bearing records, including:
at least one computer, wherein the at least one computer includes computer executable instructions including browser software operative in the at least one computer;
a card reader in operative connection with the at least one computer, wherein the card reader is operative to read card data from a user card, wherein the card data corresponds to a financial account;
a sheet dispenser in operative connection with the at least one computer, wherein the at least one computer is operative responsive to the card data read from the card through operation of the card reader to cause a financial transfer involving the financial account corresponding to the card data;
and wherein operation of the machine is operative to cause at least one of the card reader and the sheet dispenser to have at least one condition;
and wherein the at least one computer is operative to produce at least one markup language document wherein the at least one markup language document includes data corresponding to the at least one condition.

2. The apparatus according to claim 1
wherein the at least one computer is operative to receive at least one further markup language document,
wherein the at least one computer is operative to process the at least one further markup language document through operation of the browser software, and
wherein the browser software is operative to cause the sheet dispenser to dispense from the machine at least one sheet having an associated value,
wherein the at least one computer is operative to cause an amount corresponding to the value to be assessed to the financial account corresponding to the card data.

3. The apparatus according to claim 1 wherein the at least one condition corresponds to a status of at least one of the card reader and the sheet dispenser, wherein the at least one computer is operative to produce at least one markup language document including at least one of card reader status data and sheet dispenser status data.

4. The apparatus according to claim 3 wherein the sheet dispenser comprises a cash dispenser, wherein the status corresponds to a fault condition in at least one of the card reader and the cash dispenser, wherein the at least one computer is operative to produce at least one markup language document indicating a fault condition in at least one of the card reader and the cash dispenser, and wherein the at least one computer is operative to cause the machine to send the at least one markup language document produced.

5. Apparatus comprising:
an automated banking machine,
wherein the machine includes at least one reader operative to read data usable to identify financial accounts,
wherein the machine includes at least one sheet dispenser,
wherein the machine has at least one operational condition corresponding to an operational status of at least one of the at least one reader and the at least one sheet dispenser,
at least one computer,
wherein the at least one computer includes computer executable instructions,
wherein the at least one computer is operative to receive and send markup language documents,
wherein the at least one computer includes a browser,
wherein the at least one computer is operative to process through operation of the browser, at least one received markup language document that includes instructions associated with operation of at least one function device of the machine,
wherein the at least one computer is in operative connection with the at least one reader,
wherein the at least one computer is operative to cause financial transfers involving a financial account associated with data read by the at least one reader,
wherein the at least one computer is in operative connection with the at least one sheet dispenser,
wherein the at least one computer is operative to cause the at least one sheet dispenser to dispense at least one sheet from the machine, wherein the at least one computer is operative to produce at least one of reader status data and sheet dispenser status data associated with the at least one operational condition,
  wherein the at least one computer is operative to generate at least one markup language document that includes at least one of produced reader status data and produced sheet dispenser status data,
    wherein the at least one computer is operative to cause the at least one markup language document to be sent to at least one other computer remotely located from the machine.

6. The apparatus according to claim 5 wherein the at least one dispensed sheet has an associated value, and wherein the at least one computer is operative to cause an amount corresponding to the sheet value to be assessed to the financial account.

7. (ca) The apparatus according to claim 5 wherein the at least one reader comprises a card reader, wherein the at least one sheet dispenser comprises a cash dispenser, wherein the status corresponds to a fault condition in at least one of the card reader and the cash dispenser, wherein the at least one computer is operative to generate at least one markup language document indicating a fault condition in at least one of the card reader and the cash dispenser, and wherein the at least one computer is operative to cause the at least one markup language document generated to be sent to the at least one other computer.

8. The apparatus according to claim 5
  wherein the at least one computer is operative to receive at least one first markup language document that includes first instructions,
    wherein the browser is operative to process the at least one first markup language document,
      wherein the first instructions are configured to cause the at least one computer to cause operation of at least one of the at least one reader and the at least one sheet dispenser,
        wherein the operation of the at least one of the at least one reader and the at least one sheet dispenser causes the machine to have the at least one operational condition.

9. Apparatus comprising:
an automated banking machine,
  wherein the machine includes at least one reader operative to read user data usable to identify a financial account,
at least one computer,
  wherein the at least one computer is in operative connection with the at least one reader,
    wherein the at least one computer is operative to receive read user data from the at least one reader,
  wherein the at least one computer includes a browser,
  wherein the at least one computer is configured to receive at least one markup language document that includes instructions associated with operation of at least one function device of the machine,
    wherein the at least one computer is operative to process through operation of the browser, the instructions in the at least one markup language document,
    wherein the at least one computer is configured to operate to cause at least one financial transfer involving the financial account, responsive at least in part to both
      the read user data received from the at least one reader, and
      the instructions processed through operation of the browser.

10. The apparatus according to claim 9 wherein the at least one reader comprises a card reader and wherein the at least one computer is operative responsive at least in part to the at least one markup language document to cause operation of the card reader to read user data.

11. The apparatus according to claim 9 wherein the at least one markup language document includes Java script.

12. The apparatus according to claim 9
  wherein the automated banking machine includes at least one transaction function device,
  wherein in causing the at least one financial transfer, the at least one transaction function device is operated,
    wherein the instructions cause the at least one computer to cause operation of the at least one transaction function device.

13. The apparatus according to claim 12
  wherein operation of the at least one transaction function device is operative to cause the machine to have at least one operational condition corresponding to an operational status of the at least one transaction function device,
  wherein the at least one computer is operative to generate at least one further markup language document,
    wherein the at least one further markup language document includes data corresponding to the at least one operational condition,
  wherein the at least one computer is configured to receive the at least one markup language document from a first remote computer,
  wherein the at least one computer is operative to cause the at least one further markup language document to be sent from the machine to a second remote computer different from the first remote computer.

14. A method comprising: p1 (a) operating at least one computer to cause operation of an automated banking machine,
  wherein the machine includes at least one reader operative to read data usable to identify financial accounts,
    wherein the at least one computer is operative to cause financial transfers involving a financial account associated with data read by the at least one reader,
  wherein the machine includes at least one sheet dispenser,
    wherein the at least one computer is operative to cause the at least one sheet dispenser to dispense at least one sheet from the machine,
  wherein the machine has at least one operational condition corresponding to an operational status of at least one of the at least one reader and the at least one sheet dispenser,
  wherein the at least one computer includes computer executable instructions,
    wherein the at least one computer is operative to receive and send markup language documents,
    wherein the at least one computer includes a browser,
      wherein the at least one computer is operative to process through operation of the browser, at least one received markup language document that includes instructions associated with operation of at least one function device of the machine;
(b) operating the at least one computer to cause to be produced, at least one of reader status data and sheet dispenser status data associated with the at least one operational condition; Zone Name: OCRZone (c) operating the at least one computer to cause to be generated, at least one markup language document that includes the at least one of reader status data and sheet dispenser status data produced in (b); and (d) operating the at least one computer to cause the at least one markup language document generated in (c) to be sent to at least one other computer remotely located from the machine.

15. The method according to claim 14 wherein the at least one operational condition corresponds to a fault condition in at least one of the at least one reader and the at least one sheet dispenser.

16. The method according to claim 14 wherein the sheet dispenser comprises a cash dispenser, and wherein the at least one operational condition corresponds to an operational status of the cash dispenser.

17. The method according to claim 14 and further comprising:

(e) operating the at least one computer to cause the machine to receive at least one other markup language document from the at least one remote financial computer;

(f) operating the at least one computer responsive at least in part to the at least one other markup language document received in (e) to cause the machine to operate at least one device of the machine.

18. The method according to claim 14 and further comprising:

(e) operating the at least one computer to cause the machine to receive at least one other markup language document from at least one remote computer;

(f) operating the at least one computer responsive at least in part to the at least one other markup language document received in (e) to cause the machine to modify operation of at least one device in the machine.

19. The method according to claim 14 and further comprising (e) prior to (b), operating at least one computer to receive at least one first markup Language document, (f) operating the browser to process the at least one first markup language document, wherein the at least one first markup language document includes instructions, wherein the instructions are configured to cause the at least one computer to cause operation of at least one of the at least one reader and the at least one sheet dispenser, wherein the operation of the at least one readrer and the at least one Sheet dispenser caused in (f) causes the machine to have the at least one operational condition.

20. The method according to claim 14 wherein the at least one operational condition corresponds to an operational status of the at least one reader.

21. The method according to claim 14 wherein (b) includes operating the at least one computer to cause the machine to produce the at least one of reader status data and sheet dispenser status data, wherein (c) includes operating the at least one computer to cause the machine to generate the at least one markup language document, wherein (d) includes operating the at least one computer to cause the machine to send the at least one markup language document.

22. At least one article including computer executable instructions configured to cause at least one computer associated with an automated banking machine which includes at least one reader and at least one sheet dispenser and which has at least one operational condition corresponding to an operational status of at least one of the at least one reader and the at least one sheet dispenser, to carry out a method comprising:

(a) operating the at least one computer to cause operation of the automated banking machine, wherein the at least one computer is operative to cause financial transfers involving a financial account associated with data read by the at least one reader, wherein the at least one computer is operative to cause the at least one sheet dispenser to dispense at least one sheet from the machine, wherein the at least one computer is operative to receive and send markup language documents, wherein the at least one computer includes a browser, wherein the at least one computer is operative to process through operation of the browser, at least one received markup language document that includes instructions associated with operation of at least one function device of the machine;

(b) operating the at least one computer to cause to be produced, at least one of reader status data and sheet dispenser status data associated with the at least one operational condition;

(c) operating the at least one computer to cause to be generated, at least one markup language document that includes the at least one of reader status data and sheet dispenser status data produced in (b); and (d) operating the at least one computer to cause the at least one markup language document generated in (c) to be sent to at least one other computer remotely located from the machine.

23. The at least one article according to claim 22 and further comprising (e) prior to (b), operating the at least one computer to receive at least one first markup language document, (f) operating the browser to process the at least one first markup language document, wherein the at least one first markup language document includes first instructions, wherein the first instructions are configured to cause the at least one computer to cause operation of at least one of the at least one reader and the at least one sheet dispenser, wherein the operation of the at least one of the at least one reader and the at least one sheet dispenser caused in (f) causes the machine to have the at least one operational condition.

* * * * *

UNITED STATES PATENT AND TRADEMARK OFFICE
CERTIFICATE OF CORRECTION

| | |
|---|---|
| PATENT NO. | : 7,934,644 B2 |
| APPLICATION NO. | : 12/378491 |
| DATED | : May 3, 2011 |
| INVENTOR(S) | : Steven Shepley et al. |

It is certified that error appears in the above-identified patent and that said Letters Patent is hereby corrected as shown below:

Column 13, Line 19:
Remove "(ca)".

Column 14, Line 37:
Remove "p1".

Column 14, Line 67:
Remove "Zone Name: OCRZone".

Signed and Sealed this
Fourth Day of October, 2011

David J. Kappos
*Director of the United States Patent and Trademark Office*